(12) United States Patent
Dickson et al.

(10) Patent No.: US 10,870,404 B2
(45) Date of Patent: Dec. 22, 2020

(54) ELONGATE ILLUMINATED AUTOMOTIVE DESIGN ELEMENT, INJECTION MOLDED VEHICLE PARTS, AND METHODS OF MANUFACTURING SAME

(71) Applicant: SMR Patents S.à.r.l., Luxembourg (LU)

(72) Inventors: James Dickson, Lonsdale (AU); Jacob Messenger, Lonsdale (AU); Sam Thoday, Lonsdale (AU); Dean Caruso, Lonsdale (AU); Gary Dekievit, Lonsdale (AU); Simon Belcher, Lonsdale (AU); Scott Edwards, Lonsdale (AU)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 16/284,210

(22) Filed: Feb. 25, 2019

(65) Prior Publication Data

US 2019/0256025 A1 Aug. 22, 2019

Related U.S. Application Data

(63) Continuation-in-part of application No. 15/402,079, filed on Jan. 9, 2017, now Pat. No. 10,214,140.

(30) Foreign Application Priority Data

Jan. 11, 2016 (AU) .................. 2016900068

(51) Int. Cl.
*B60R 19/52* (2006.01)
*B60Q 1/26* (2006.01)
(Continued)

(52) U.S. Cl.
CPC .......... *B60R 19/52* (2013.01); *B29C 45/0001* (2013.01); *B29C 45/1657* (2013.01);
(Continued)

(58) Field of Classification Search
CPC .............. B60R 19/52; B60R 2019/535; B60R 2019/525
(Continued)

(56) References Cited

U.S. PATENT DOCUMENTS 3,212,204 A * 10/1965 Smith ................. G09F 3/00
40/1.5
3,246,066 A * 4/1966 Gits ................. B29C 39/00
264/132
(Continued)

FOREIGN PATENT DOCUMENTS

CN 204055319 U 12/2014
DE 102010008334 A1 8/2011
(Continued)

OTHER PUBLICATIONS

European Extended Search Report of EP 16203317.9, dated May 16, 2017.
(Continued)

*Primary Examiner* — Dennis H Pedder
(74) *Attorney, Agent, or Firm* — Jones Day (57) ABSTRACT

A vehicle part includes an injection molded main body having a front side and a rear side with a three dimensional form on the rear side, a metallized coating on one or more portions of the three dimensional form on the rear side of the injection molded main body, and a backing layer overmolded on the rear side of the injection molded main body, the three dimensional form, and the metallized coating.

20 Claims, 9 Drawing Sheets

(51) Int. Cl.
*B60Q 1/28* (2006.01)
*F21S 43/20* (2018.01)
*B29C 45/00* (2006.01)
*B60R 13/04* (2006.01)
*B32B 7/12* (2006.01)
*B29C 45/16* (2006.01)

(52) U.S. Cl.
CPC .............. *B32B 7/12* (2013.01); *B60Q 1/2661* (2013.01); *B60Q 1/28* (2013.01); *B60R 13/04* (2013.01); *F21S 43/26* (2018.01); *B29C 45/1618* (2013.01); *B32B 2255/205* (2013.01); *B60R 2019/525* (2013.01)

(58) Field of Classification Search
USPC .............................. 296/193.1; 180/68.1, 68.6
See application file for complete search history.

(56) References Cited

U.S. PATENT DOCUMENTS

| | | | |
|---|---|---|---|
| 5,837,354 A * | 11/1998 | Ogisu | C23C 14/20 428/208 |
| 8,382,351 B2 | 2/2013 | Ishikawa et al. | |
| 9,162,616 B2 | 10/2015 | Wu | |
| 10,596,994 B2 * | 3/2020 | Yoshimoto | B62D 21/152 |
| 2007/0104897 A1 * | 5/2007 | Oba | B60R 13/00 428/31 |
| 2011/0170307 A1 | 7/2011 | Ishikawa et al. | |
| 2013/0293104 A1 | 11/2013 | Wu | |

FOREIGN PATENT DOCUMENTS

| | | |
|---|---|---|
| EP | 2650590 A3 | 4/1916 |
| EP | 2325059 A1 | 5/2011 |
| EP | 2650590 A2 | 10/2013 |
| EP | 2735476 A2 | 5/2014 |
| EP | 2746106 A1 | 6/2014 |
| GB | 2451125 A | 1/2009 |
| JP | 2015099654 A | 5/2015 |

OTHER PUBLICATIONS

European Extended Search Report of EP 20184650.8, dated Sep. 17, 2020.

* cited by examiner

ELONGATE ILLUMINATED AUTOMOTIVE DESIGN ELEMENT, INJECTION MOLDED VEHICLE PARTS, AND METHODS OF MANUFACTURING SAME

CROSS-REFERENCE TO RELATED APPLICATIONS

This application is a continuation-in-part of U.S. patent application Ser. No. 15/402,079, now U.S. Pat. No. 10,214,140, filed Jan. 9, 2017, which claims priority from Australian Provisional Patent Application No. 2016900068, filed Jan. 11, 2016, each of which is incorporated herein by reference in its entirely for all purposes.

TECHNICAL FIELD

The present disclosure relates in general to an elongate illumination assembly that can provide a uniform elongate light output, and injection molded vehicle parts and methods of manufacturing same.

BACKGROUND

A common feature in automotive applications is to provide various automotive elements which feature illumination of the key features of the elements. One example of an automotive element are grill elements. Many grill elements are elongate and may also have a repeating or non-repeating pattern. It is desirable that the grill elements are able to be illuminated along their length with an even (uniform or homogenous) luminance using light emitting diodes (LEDs) input. An LED is a directional light source having a relative luminous intensity that decreases as the viewing angle is increased. Using an LED may result in the appearance of bright or hot spots to an external viewer of the grill element.

Lighting systems that provide a uniform luminous intensity are known, for example systems using expensive organic light emitting diode (OLED) technology or complex lens and reflector arrangements. Highly diffusing materials are also used but these have the drawback of giving a milky or hazy appearance and have poor optical efficiency. Optic features may also be used on clear materials to diffuse light, but these have the drawback that the optic features are visible in the unlit state which is undesirable.

SUMMARY OF THE INVENTION

In one aspect, a vehicle part includes an injection molded main body including a front side and a rear side with a three dimensional form on the rear side, a metallized coating on one or more portions of the three dimensional form on the rear side of the injection molded main body, and a backing layer overmolded on the rear side of the injection molded main body, the three dimensional form, and the metallized coating.

The three dimensional form may include at least one of inwardly protruding areas formed into the rear side of the injection molded main body, outwardly protruding areas protruding from the rear side of the injection molded main body, or one or more surfaces including a grain effect.

The injection molded main body may include polycarbonate.

The vehicle part may further include a hard coating applied to the front side of the injection molded main body for improved abrasion resistance.

The vehicle part may further include an injection molded mesh, wherein the vehicle part is a vehicle grille.

The metallized coating may be applied around apertures of the vehicle grille.

The metallized coating may include at least one of aluminum, chrome, aluminum germanium (AlGe), and aluminum titanium.

The backing layer may include a plastic material.

One or more areas of the injection molded main body that are not coated with the metallized coating may form an adhesive bond with the overmolded backing layer.

The adhesive bond may include a tensile pull apart force of greater than or equal to about 4.7 $N/mm^2$.

The one or more portions of the three dimensional form that are coated with the metallized coating may be fully encapsulated and sealed between the injection molded main body and the overmolded backing layer.

In another aspect, a method of making a vehicle part may include injection molding a main body including a front side and a rear side, forming a three dimensional form on the rear side of the injection molded main body, coating a metallized coating on one or more portions of the three dimensional form on the rear side of the injection molded main body, and overmolding a backing layer on the rear side of the injection molded main body, the three dimensional form, and the metallized coating.

The three dimensional form may include at least one of inwardly protruding areas formed into the rear side of the injection molded main body, outwardly protruding areas protruding from the rear side of the injection molded main body, or one or more surfaces including a grain effect.

The injection molded main body may include polycarbonate.

The method may further include applying a hard coating to the front side of the injection molded main body for improved abrasion resistance.

The method may further include providing an injection molded mesh where the vehicle part is a vehicle grille.

The coating of the metallized coating may include coating the metallized coating around apertures of the vehicle grille.

The metallized coating may include at least one of aluminum, chrome, aluminum germanium (AlGe) and aluminum titanium.

The backing layer may include a plastic material having at least one of acrylonitrile styrene acrylate (ASA), acrylonitrile butadiene styrene (ABS), polyethylene terephthalate (PETE or PET), polyethylene (PE), polyvinyl chloride (PVC), polypropylene (PP), polystyrene (PS).

The one or more areas of the injection molded main body that are not coated with the metallized coating may form an adhesive bond with the overmolded backing layer.

The adhesive bond may include a tensile pull apart force of greater than or equal to about 4.7 $N/mm^2$.

The one or more portions of the three dimensional form that are coated with the metallized coating may be fully encapsulated and sealed between the injection molded main body and the overmolded backing layer.

BRIEF DESCRIPTION OF THE DRAWINGS

The foregoing summary, as well as the following detailed description, will be better understood when read in conjunction with the appended drawings. For the purpose of illustration, certain examples of the present disclosure are shown in the drawings. It should be understood, however, that the present disclosure is not limited to the precise arrangements and instrumentalities shown. The accompanying drawings, which are incorporated in and constitute a part of this specification, illustrate an implementation of system, apparatuses, and methods consistent with the present disclosure and, together with the detailed description, serve to explain advantages and principles consistent with the present disclosure, wherein.

DETAILED DESCRIPTION

It is to be understood that the disclosure is not limited in its application to the details of construction and to the arrangements of the components set forth in the following description or illustrated in the drawings. The Figures and written description are provided to teach those skilled in the art to make and use the inventions for which patent protection is sought. The disclosure is capable of other embodiments and of being practiced and carried out in various ways. Those skilled in the art will appreciate that not all features of a commercial embodiment are shown for the sake of clarity and understanding. Those skilled in the art will also appreciate that the development of an actual commercial embodiment incorporating aspects of the present disclosure may require numerous implementation-specific decisions to achieve the developer's ultimate goal for the commercial embodiment.

In addition, it is to be understood that the phraseology and terminology employed herein are for the purpose of describing the present disclosure and should not be regarded as limiting. For example, the use of a singular term, such as, "a" is not intended as limiting of the number of items. Also, the use of relational terms, such as but not limited to, "top," "bottom," "left," "right," "upper," "lower," "down," "up," "side," are used in the description for clarity in specific reference to the Figures and are not intended to limit the scope of the present disclosure. Further, it should be understood that any one of the features may be used separately or in combination with other features. Other systems, methods, features, and advantages will be or become apparent to those skilled in the art upon examination of the Figures and the description. The term "driver" is used throughout this disclosure but is not limited to a person who is operating or controlling the vehicle; it may refer to any vehicle occupant, person, passenger, or user inside the vehicle, or, in certain circumstances, a person who is outside the vehicle but controlling the vehicle or interested in movement of the vehicle. It is intended that all such additional systems, methods, features, and advantages be included within this description, and be within the scope of the present disclosure.

Figure 1:
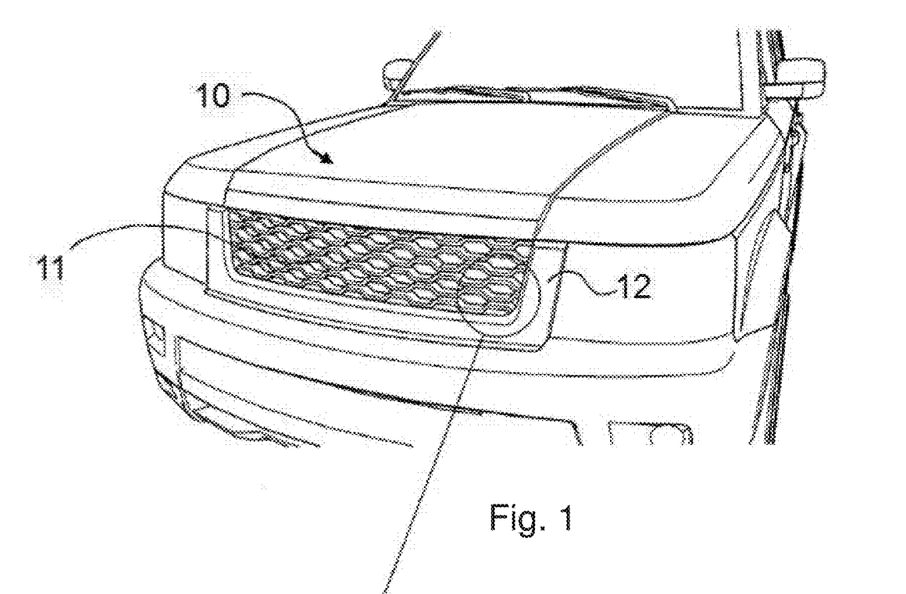
FIG. 1 is a view of an example of an automotive grill assembly in an unlit state.
Figure 2A:
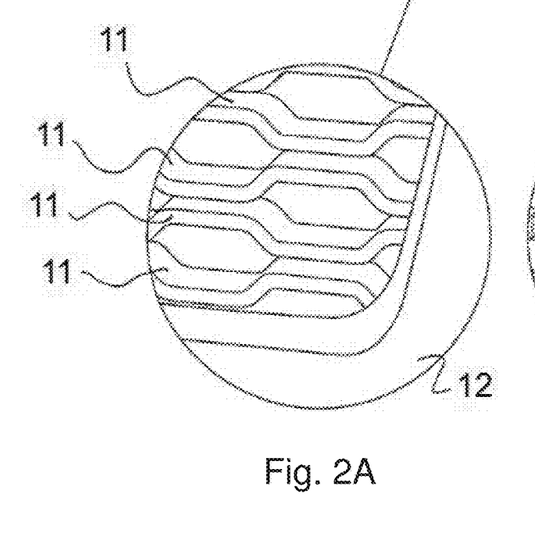
FIG. 2A is a detailed view of a section of the automotive grill assembly of FIG. 1 in an unlit state.
Figure 2B:
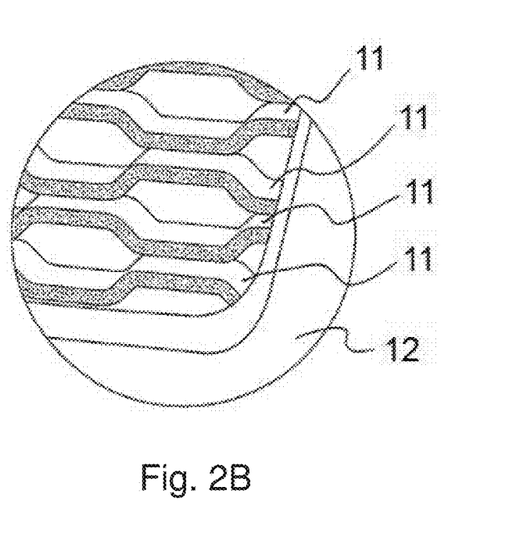
FIG. 2B is a detailed view of a section of the automotive grill assembly of FIG. 1 in a lit state.

Referring now to FIGS. 1, 2A and 2B, there is shown an automotive grill assembly 10 including a number of elongate grill elements 11 and a grill surround 12. In FIGS. 1 and 2A the grill assembly 10 is in an unlit state, whereas in FIG. 2B, the grill assembly 10 is in a lit state. As can be seen, the leading edge of each grill element 11 is illuminated, highlighting the repeating wave pattern of this example.

Referring now to FIGS. 3 to 8, there is shown an example of an elongate illumination assembly 20. The elongate illumination assembly 20 has an elongate housing 23, printed circuit boards (PCBs) 22 featuring light emitting diodes (not shown), an elongate light guide 24 and an elongate lens 21 with a generally V-shaped cross-section and repeating wave pattern profile. The lens 21 profile may be shaped in a variety of different repeating and non-repeating patterns.

Figure 3:
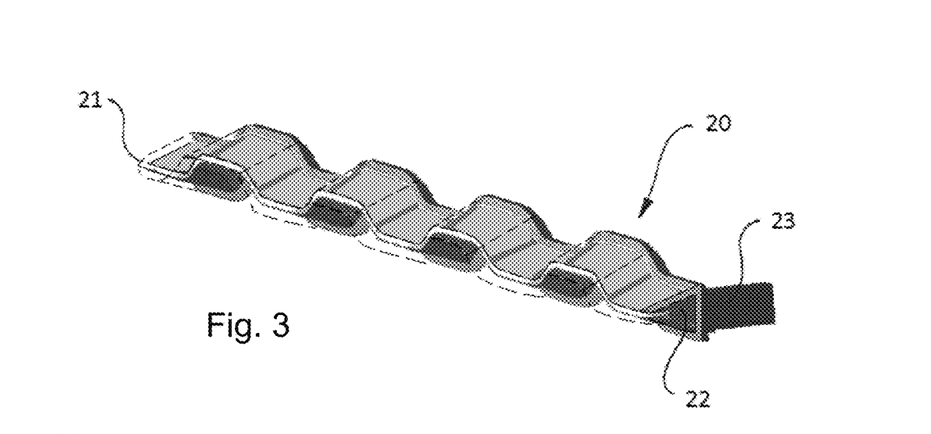
FIG. 3 is a perspective view of an example of an elongate illumination assembly.

The housing 23 forms the backing for the illumination assembly 20, it provides structural reinforcement to the illumination assembly 20 and may be manufactured from a weather resistant plastic such as acrylonitrile styrene acrylate (ASA) or acrylonitrile butadiene styrene (ABS). The light guide 24 and PCBs 22 are housed within the V-shape of the lens 21 which is then connected or joined to the housing 23 (e.g. by welding) such that the light guide 24 and PCBs 22 are housed within the lens 21 and housing 23.

Figure 4:
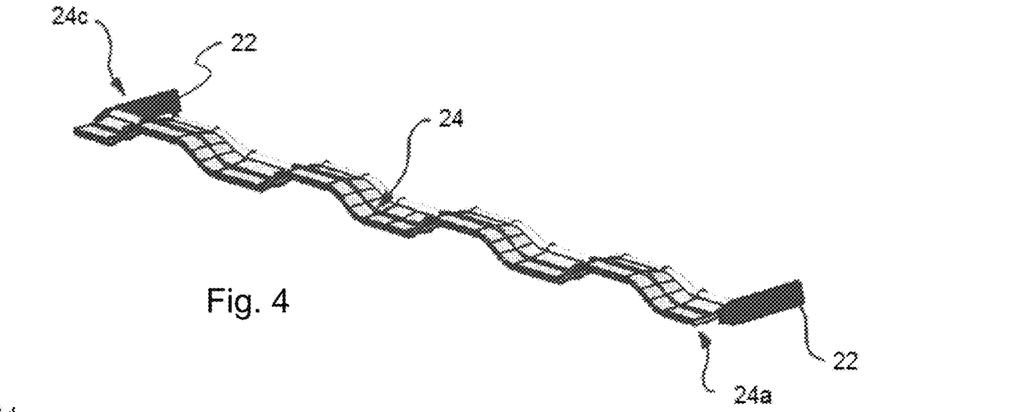
FIG. 4 is a perspective view of the elongate light guide and PCB sub-assembly of FIG. 3.
Figure 5:
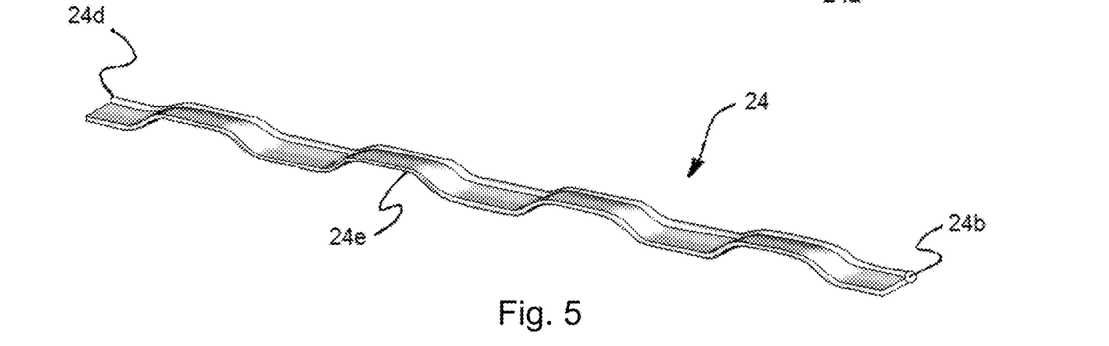
FIG. 5 is a perspective view of the elongate light guide of FIG. 4.

As is best seen in FIGS. 4 and 5, the light guide 24 has a first end 24a having a first light receiving surface 24b, a second end 24c having a second light receiving surface 24d, and a light emitting surface 24e viewable to an external viewer of the illumination assembly 20 through the lens 21. A PCB 22 is located at both the first end 24a and the second end 24c of the light guide 24. An LED light source located on each PCB 22 is positioned adjacent to the first light receiving surface 24b and the second light receiving surface 24d of the light guide 24, which is configured to allow light to enter the light guide 24 through the light receiving surfaces 24b, 24c. The light guide 24 is adapted to be substantially transparent and without any visible discrete optic features in an un-lit state while being diffusive in a lit-state. When lit, light exits the light guide 24 at light emitting surface 24e with substantially uniform luminous intensity across the surface.

Figure 6:
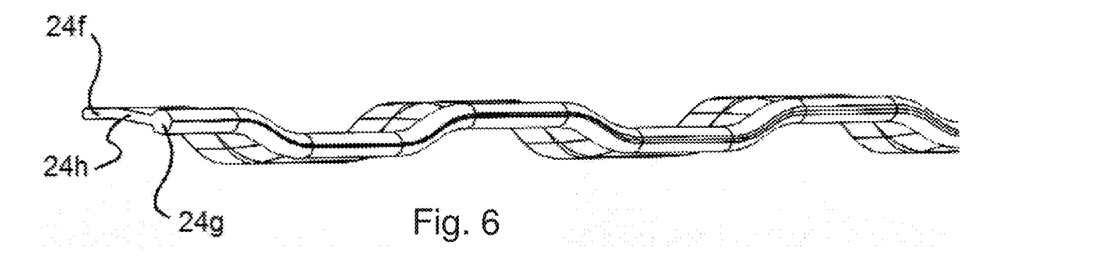
FIG. 6 is a partial rear perspective view of the elongate light guide of FIG. 4 with contour lines.
Figure 7:
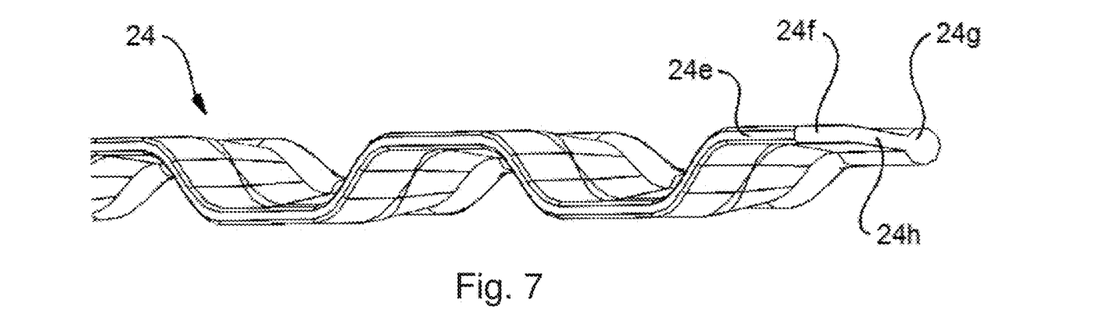
FIG. 7 is a partial front perspective view of the elongate light guide of FIG. 4 with contour lines.

As is best seen in FIGS. 6 and 7, the light guide 24 has a varying cross sectional area and profile along its depth. The light guide 24 has a front region 24f (adjacent the light emitting surface 24e) and a rear region 24g (furthest from the light emitting surface 24e). The rear region 24g has a larger sectional thickness than the front region 24f. In this example, the rear region 24g has a generally bulbous shape. The front region 24f has a generally consistent sectional thickness which has a ribbon-like shape.

The light emitting surface 24e has the same repeating wave profile as the leading edge of the lens 21. The front region 24f also has this repeating wave profile. As is best seen in FIGS. 6 and 7, the rear section 24g also has a repeating wave profile but with a smaller amplitude resulting in a straighter profile.

The light guide 24 also has a transitionary region 24h, connecting the front and rear regions 24f, 24g and having a profile that transitions from that of the rear region 24g to that of the front region 24f.

Figure 8:
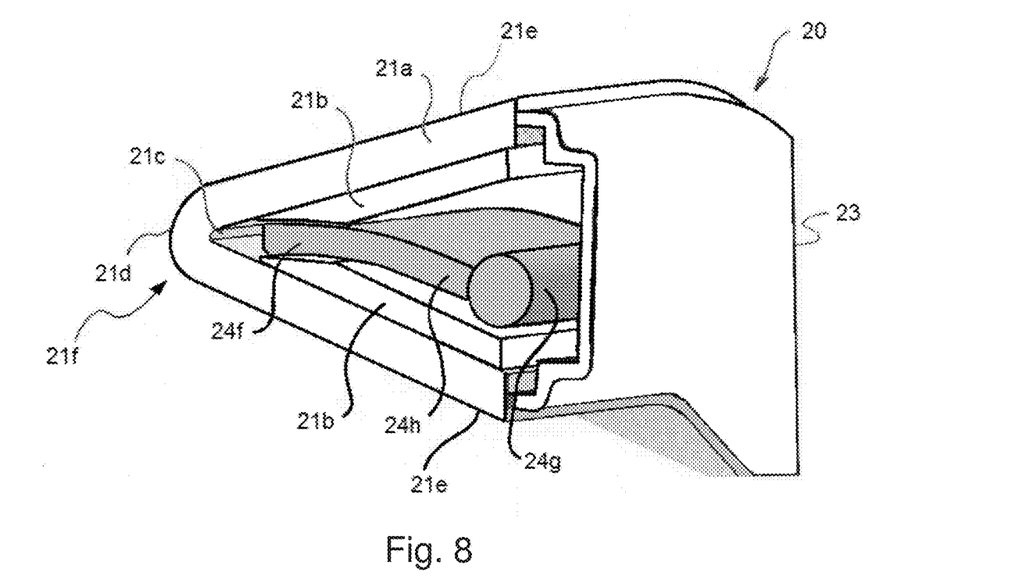
FIG. 8 is a sectional view of the elongate illumination assembly of FIG. 3.

As shown in FIG. 8, the light guide 24 is disposed behind the lens 21 which has an apex region 21f (or leading edge) with a light emitting surface 21d and from which a pair of spaced-apart blade portions 21e extend away to define the generally V-shaped cross-section. The lens 21 has a clear or tinted outer portion 21a and an opaque inner portion 21b, wherein the lens 21 remains entirely clear along the apex 21f immediately behind the light emitting surface 21d and adjacent the light emitting surface 24e of the light guide 24 to allow light emitted from the light guide 24 to enter the lens 21 and exit at the light emitting surface 21d. The effect of this composition is that in an unlit state, the grill assembly 10 has a uniform appearance with the light guide 24 being concealed being the lens 21. When the light source is activated, the light guide 24 lights up and emits light through the light transmissive apex region 21f of the lens 21 to the light emitting surface 21d in a substantially uniform luminous intensity.

The lens 21 may be formed in many different ways. For example, the lens 21 may be a two-component lens including a clear or tinted outer portion 21a and an opaque inner portion 21b. The two-component lens may also be formed in a co-moulding process. In another example, the lens 21 may be a single component having an opaque coating on an inner surface formed by example by applying paint or a thin film coating. The clear section (or window) 21c may be formed by etching away the opaque coating or masking the area before coating. The window 21c may be approximately 10 mm high.

Figure 9:
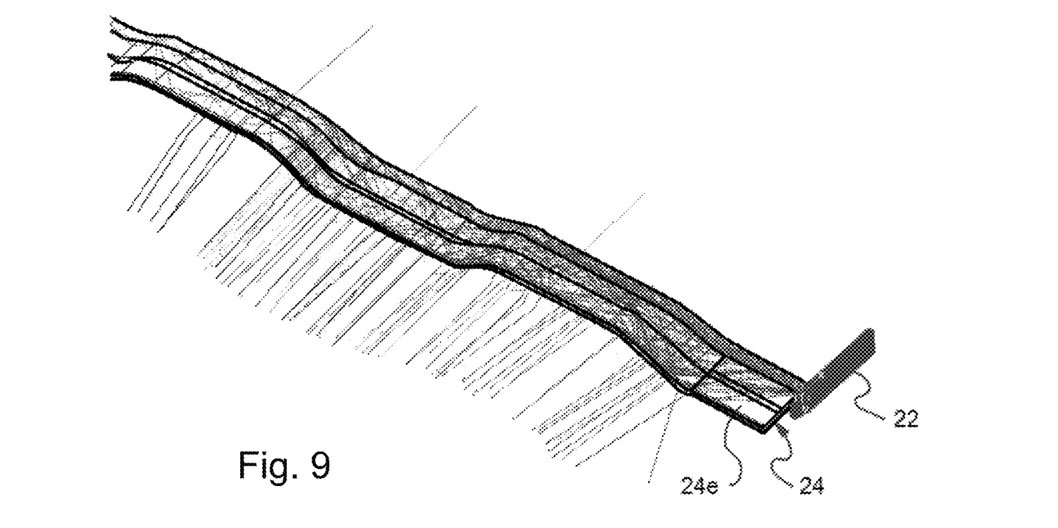
FIG. 9 is an isometric view of a schematic of the elongate light guide of FIG. 4 when in a lit state.
Figure 10:
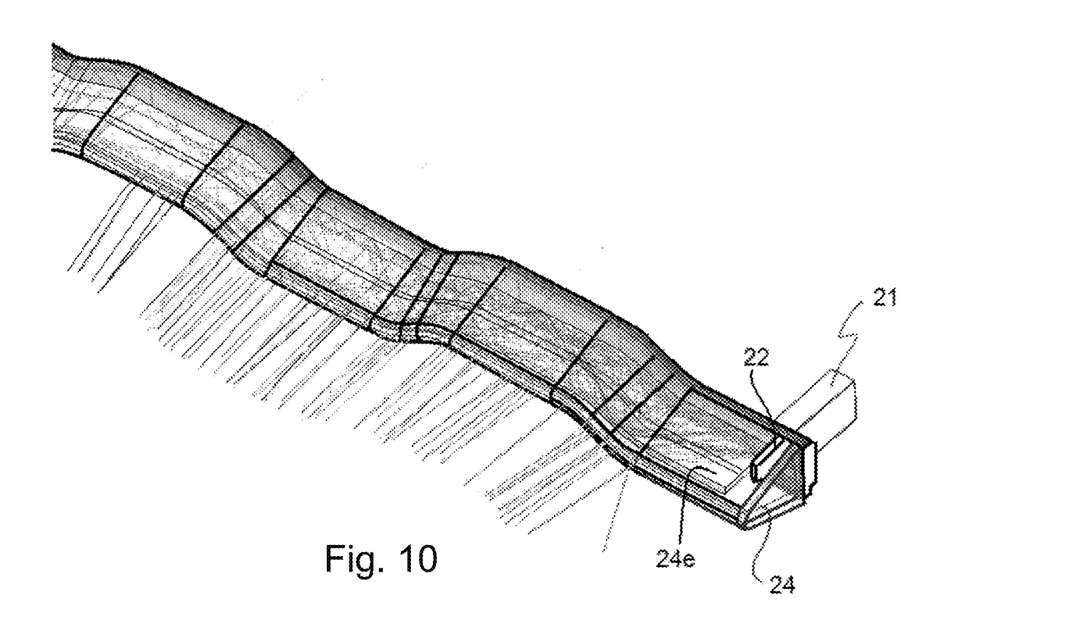
FIG. 10 is an isometric view of a schematic of the elongate illumination assembly of FIG. 3 when in a lit state.

Referring now to FIGS. 9 and 10, which shows a schematic of the elongate light guide 24 and the elongate illumination assembly 20 in a lit state, illustrating how light rays behave when the light guide 24 is lit by a single LED light source, and the light rays enter the light guide 24 and are guided toward the light exiting surface 24e.

The elongate light guide 24 is referred to as a particle filled light guide to distinguish it from a crystal clear light guide (traditional light guide). In a traditional light guide, light is transmitted from a light source to a point at some distance from the source with minimal loss by total internal reflection.

In this particle filled elongate light guide 24, the transmission of light from the light source to the light emitting surface 24e, is achieved through a combination of the use of internal reflection and light scattering particles.

Internal reflection is encouraged through the geometry of the light guide 24, wherein light rays enter the light guide 24 through the first and second light receiving surfaces 24b, 24d and are guided along the rear region 24g of the light guide 24.

The internal geometry of the rear region 24g (bulbous shape and straightened profile) encourages internal reflection with the incidence angle of the bulk of the light rays approaching the outer surface of the rear region 24g such that internal reflection is promoted.

Most light rays that enter the elongate light guide 24 will encounter light scattering particles that alter the direction of the rays. The effect of this light scattering is that light rays will spread throughout the light guide 24, along the transitionary region 24h and into the front region 24f, where they will then exit through the light emitting surface 24e, also ensuring that an even distribution of light output occurs.

The light scattering particles may be titanium dioxide particles of sufficient size and concentration such that the light guide appears transparent when un-lit while providing a substantially uniform luminous intensity surface output when lit.

Referring now to FIGS. 11 to 16, where there is shown another example of an illumination assembly 30. The illumination assembly 30 has housing 31, a PCB 32 featuring a plurality of LEDs 33, a light guide 34 and an elongate lens 35 with a generally V-shaped cross-section and repeating wave pattern profile. Similarly to the first example, the lens 35 profile may be shaped in a variety of different repeating and non-repeating patterns.

Figure 11:
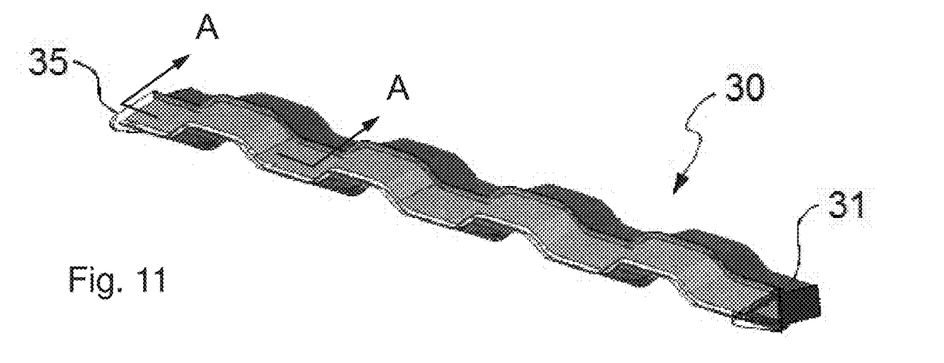
FIG. 11 is a perspective view of another example of an elongate illumination assembly.
Figure 12:
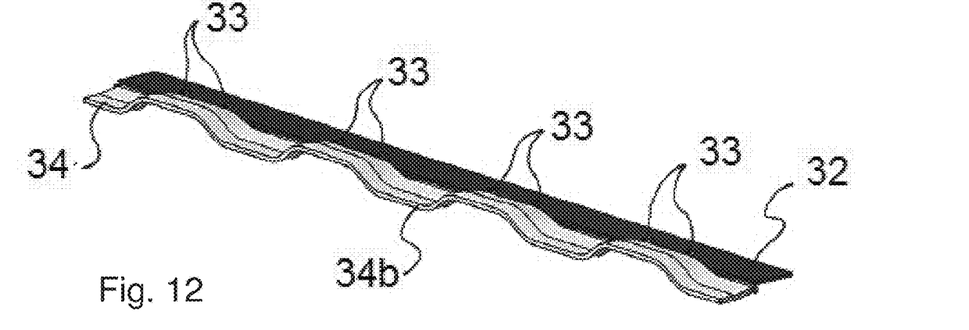
FIG. 12 is a perspective view of the elongate light guide and PCB sub-assembly of FIG. 11.
Figure 13:
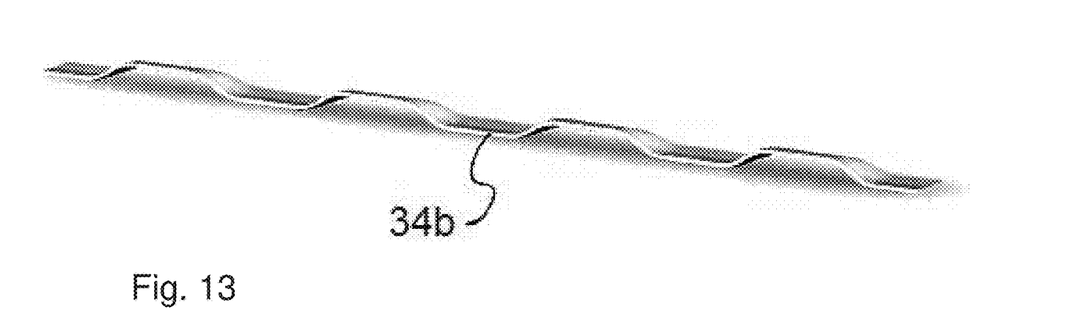
FIG. 13 is a perspective view of the elongate light guide of FIG. 12.

The housing 31 forms the backing for the illumination assembly 30 and provides structural reinforcement to the illumination assembly 30 and may be manufactured from a weather resistant plastic such as acrylonitrile styrene acrylate (ASA) or acrylonitrile butadiene styrene (ABS), and is configured to receive the PCB 32. The light guide 34 fits within the V-shape of the lens 35 which is then connected or joined to the housing 31 (e.g. by welding) such that the light guide 34 and PCB 32 are housed within the lens 35 and housing 31.

Figure 16:
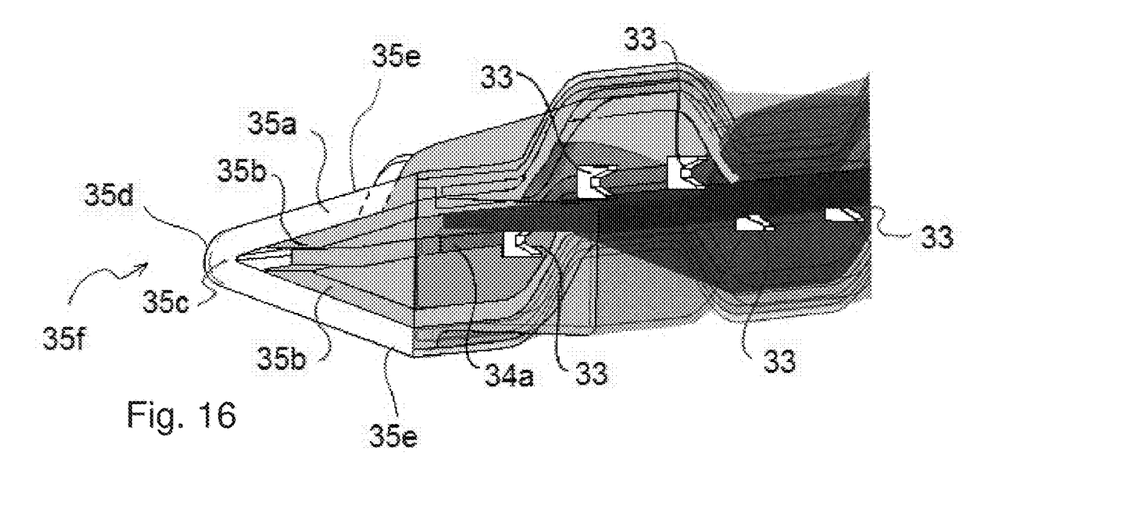
FIG. 16 is a sectional view of the elongate illumination assembly of FIG. 11.

As is best seen in FIG. 16, the PCB 32 is orientated such that its plane is transverse to that of the direction of elongation of the lens 35. A plurality of LEDs 33, are mounted on the top and bottom of the PCB 32, such that their direction of output is toward the light guide 34 and lens 35. The location of the LEDs 33 on the top and bottom of the PCB 32 is influenced by the profile of the lens 35, such that the LEDs 33 follow the profile pattern.

The light guide 34 has a light receiving surface 34a which is adjacent to the LEDs 33, and a light emitting surface 34b viewable to an external viewer of the illumination assembly 30 through the lens 35. The light guide 34 is configured to allow light to enter the light guide 34 through the light receiving surface 34a. The light guide 34 is adapted to be substantially transparent and without any visible discrete optic features in an un-lit state while being diffusive in a lit-state. When lit, light exits the light guide 34 at light emitting surface 34b with substantially uniform luminous intensity across the surface.

Figure 14:
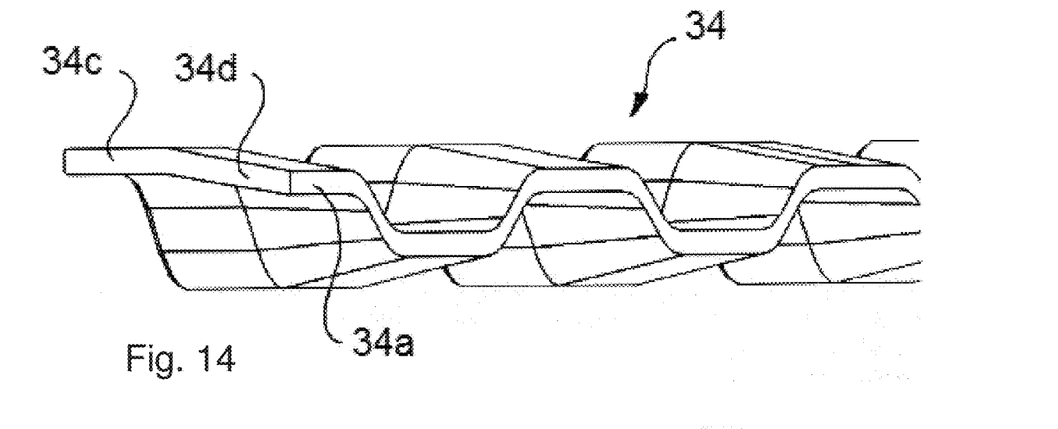
FIG. 14 is a partial rear perspective view of the light guide of FIG. 12 with contour lines.
Figure 15:
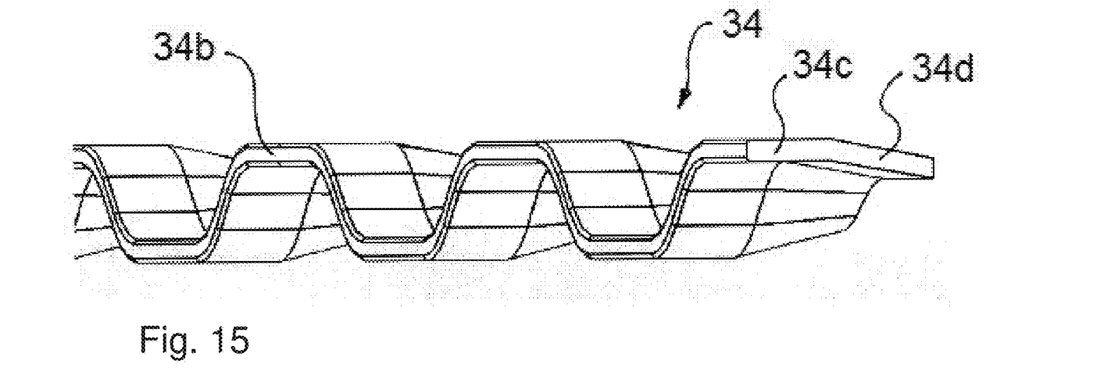
FIG. 15 is a partial front perspective view of the light guide of FIG. 12 with contour lines.

As is best seen in FIGS. 14 and 15, the light guide 34 has a varying profile along its depth. The light emitting surface 34b of the light guide 34 has the same repeating wave profile as the leading edge of the lens 35. The light receiving surface 34a of the light guide 34 also has a repeating wave profile but with a smaller amplitude resulting in a straighter profile.

The light guide has a front region 34c (adjacent the light emitting surface 34b) which has a generally consistent sectional thickness which forms a ribbon-like shape and follows the same profile as the light emitting surface 34b. The light guide also has a transitionary region 34d, connecting the front region 34c and the light receiving surface 34a, and having a profile that transitions from that of the light receiving surface 34a to that of the front region 34c. As shown in FIG. 16, the light guide 34 is disposed behind the lens 35 which has an apex 35f (or leading edge) with a light emitting surface 35d and from which a pair of spaced-apart blade portions 35e extend away to define the generally V-shaped cross-section. The lens 35 has a clear or tinted outer portion 35a and an opaque inner portion 35b, wherein the lens 35 remains entirely clear along the apex 35f immediately behind the light emitting surface 35d and adjacent the light emitting surface 34b of the light guide 34 to allow light emitted from the light guide 34 to enter the lens 35 and exit at the light emitting surface 35d. The effect of this composition is that in an unlit state, the grill assembly 10 has a uniform appearance with the light guide 34 being concealed being the lens 31. When the light source is activated, the light guide 34 lights up and emits light through the light transmissive apex region 31f of the lens 31 to the light emitting surface 31d in a substantially uniform luminous intensity.

The lens 35 may be formed in many different ways. For example, the lens 35 may be a two-component lens including a clear or tinted outer portion 35a and an opaque inner portion 35b. The two-component lens may also be formed in a co-molding process. In another example, the lens 35 may be a single component having an opaque coating on an inner surface formed by example by applying paint or a thin film coating. The clear section (or window) 35c may be formed by etching away the opaque coating or masking the area before coating. The window 35c may be approximately 10 mm high.

Figure 17:
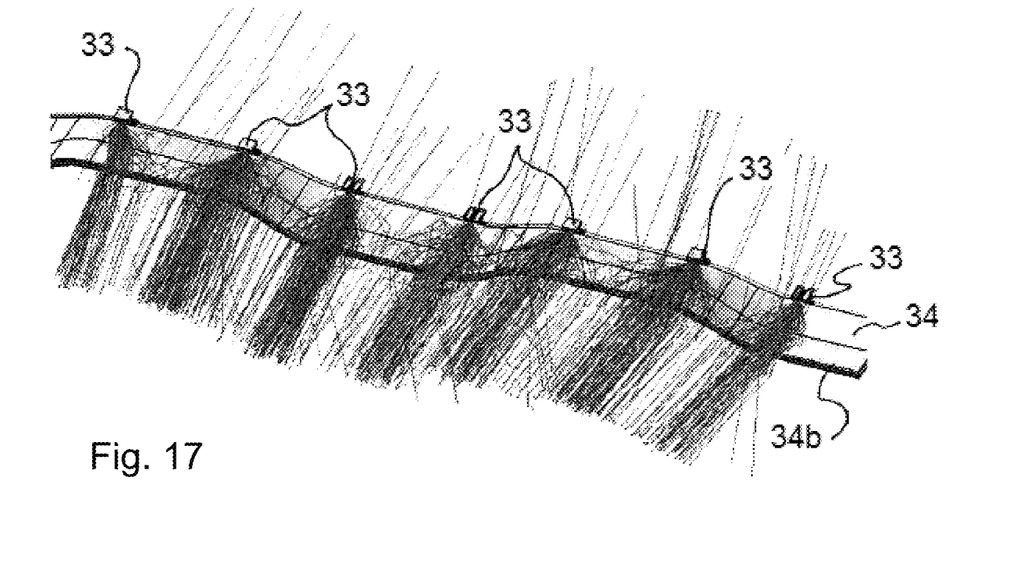
FIG. 17 is an isometric view of a schematic of the elongate light guide of FIG. 12 when in a lit state.
Figure 18:
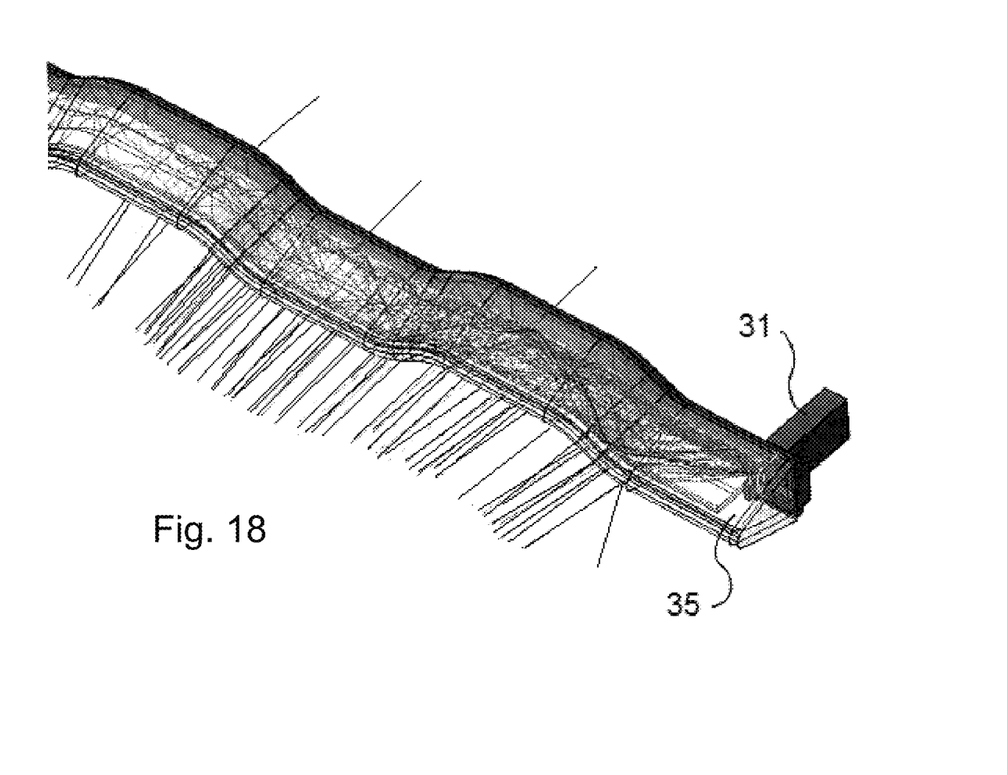
FIG. 18 is an isometric view of a schematic of the elongate illumination assembly of FIG. 11 when in a lit state.

Referring now to FIGS. 17 and 18, which show schematics of the elongate light guide 34 and the elongate illumination assembly 30 in a lit state, illustrating how light rays behave when the light guide 34 is lit by a plurality of LED light sources, and the light rays enter the light guide 34 and are guided toward the light emitting surface 34b.

The elongate light guide 34 is referred to as a particle filled light guide to distinguish it from a crystal clear light guide (traditional light guide). In a traditional light guide, light is transmitted from a light source to a point at some distance from the source with minimal loss by total internal reflection.

In this particle filled elongate light guide 34, the transmission of light from the light source to the light emitting surface 34b, is achieved through a combination of the use of internal reflection and light scattering particles.

Internal reflection is encouraged through the geometry of the light guide 34, wherein light rays enter the light guide 34 through the light receiving surface 34a, and are guided through the transitionary and front regions 34d, 34c of the light guide 34.

The internal geometry of the light guide 34 encourages internal reflection with the incidence angle of the bulk of the light rays approaching the top and bottom surfaces of the light guide 34 such that internal reflection is promoted.

Most light rays that enter the light guide 34 will encounter light scattering particles that alter the direction of the rays. The effect of this light scattering is that light rays will spread throughout the light guide 34, where they will then exit through the light emitting surface 34b with an even light output.

Figure 19:
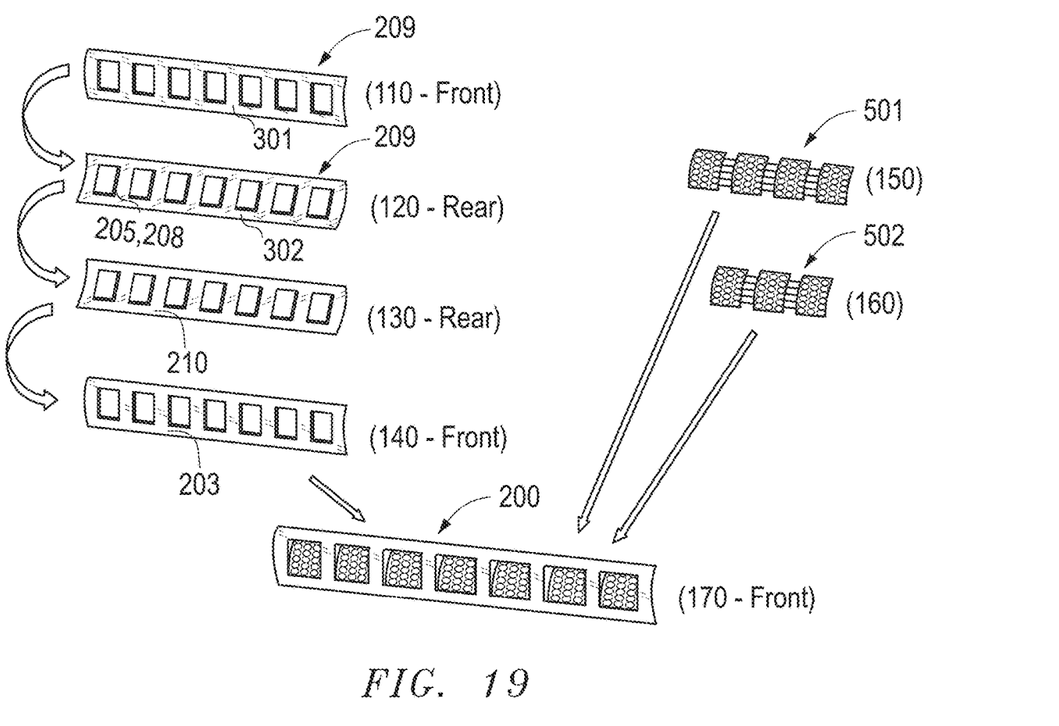
FIG. 19 is a flowchart illustrating steps of an example of a process for manufacturing a vehicle grille.

FIG. 19 is a flowchart illustrating steps of an example of a process for manufacturing a vehicle grille 200. While a vehicle grille 200 is illustrated, it should be appreciated that other vehicle parts may be formed using the same molding methods described. For example, instead of a vehicle grill 200, the described molding methods may be used to form vehicle doors, windows, emblems, roofs, among other components.

Referring to FIG. 19, step 110 through step 160 illustrate the assembly of the vehicle grille 200 which is shown in an assembled form in step 170. In step 110, a clear injection molded part 209 may be created out of a base material. A front side 301 of the clear injection molded part 209 is shown. The base material of the clear injection molded part 209 may be a polymer, a metal, a rubber, or a plastic. For example, the base material may be a polycarbonate.

Referring to step 120, a rear side 302 of the clear injection molded part 209 is shown. The clear injection molded part 209 may include a three dimensional form 208 on its rear side 302 which is coated with a metallic coating 205 (see also FIG. 21 for a more detailed illustration of the three dimensional form 208 and metallic coating 205). Still referring to FIG. 19, selected areas of the three dimensional form 208 may be masked or metallized, i.e. coated with a metallic or metallized coating 205, in step 120. The metallizing may be applied to the rear side 302 of the injection molded part 209 such as around apertures of the injection molded part 209. In step 120 of FIG. 19, the injection molded part 209 with the metallized coating 205 applied is shown from a rear side 302. Because the metallic coating 205 is applied to the three dimensional form 208, step 120 illustrates the three dimensional form 208 and metallic coating 205 together on the same portion of the rear side 302 of the injection molded part 209. The material used for metallizing the rear side 302 may include aluminum, chrome, aluminum titanium, or any other metal or combination of metal materials. The material or materials used may be reflective and capable of being overmolded.

Figure 21:
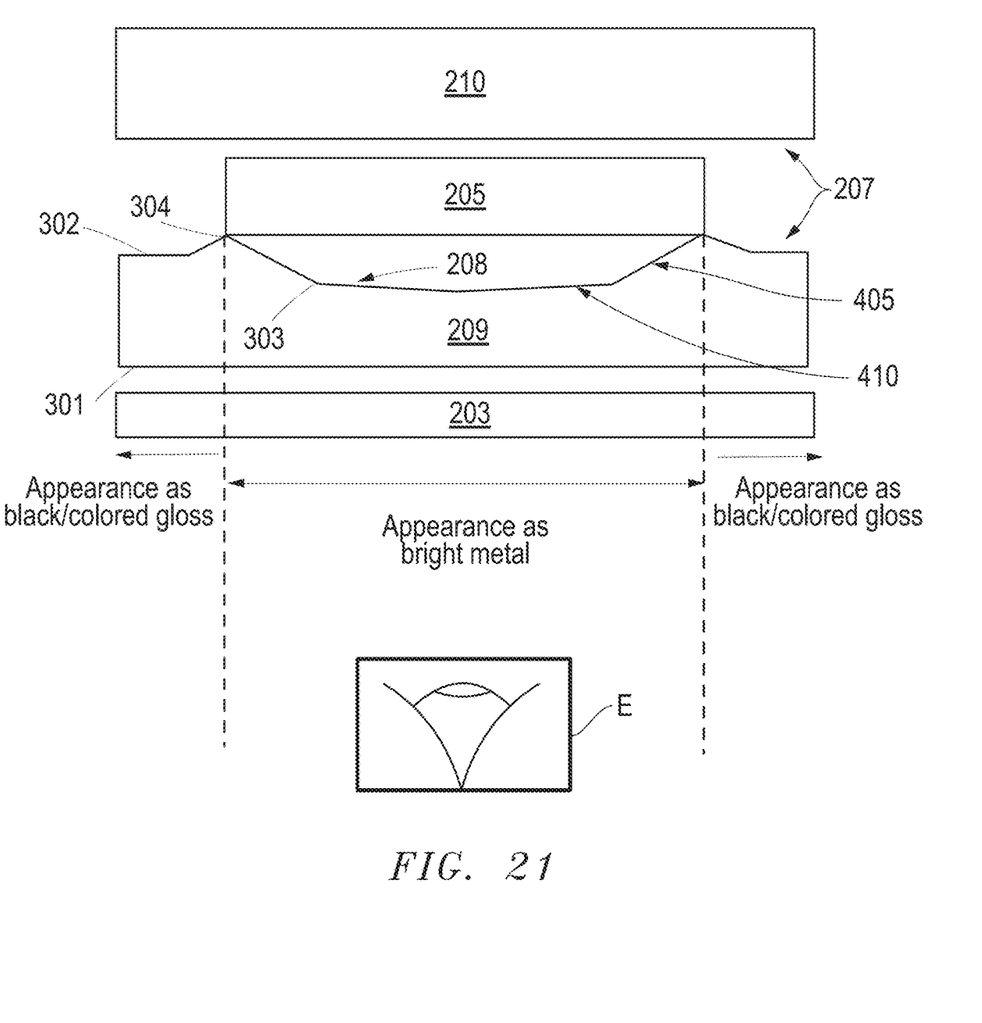
FIG. 21 is a diagram illustrating an example of the layers of the vehicle grille illustrated in FIG. 20.

FIG. 21 provides a more detailed illustration of the three dimensional form 208 and the metallic coating 205. Referring to FIG. 21, the three dimensional form 208 may include an inwardly protruding area 303 carved into the rear side 302 of the injection molded part 209, an outwardly protruding area 304 protruding from the rear side 302 of the injection molded part 209, and/or areas on the rear side 302 of the injection molded part 209 having at least one of a grained surface 405 or a gloss surface 410. In this example, all of the inwardly protruding area 303, outwardly protruding area 304, grained surface 405 and gloss surface 410 are provided; however, it should be appreciated to a person having ordinary skill in the art that any one or any combination of these features may be provided as part of the three dimensional form 208.

The inwardly protruding area 303 and the outwardly protruding area 304 may each extend along an entire length of the rear side 302 of the injection molded part 209. The inwardly protruding area 303 and the outwardly protruding area 304 may each have at least one of a uniform circular or semicircular cross-sectional shape, a square cross-sectional shape, a triangular cross-sectional shape, an octagonal cross-sectional shape, a polygonal cross-sectional shape, or an abstract cross-sectional shape. In this example, the three-dimensional form 208 includes a grained surface 405, a gloss surface 410, an inwardly protruding area 303 with a triangular cross-section shape, and an outwardly protruding area 304 with a triangular cross-sectional shape.

Referring back to FIG. 19, in step 130, the entirety of the rear side 302 of the clear injection molded part 209 (including the areas which are metallized by the metallized coating 205) may be overmolded by a backing layer 210. In step 130 of FIG. 19, only the overmolded backing layer 210 is shown because, in this step, the rear side 302 of the clear injection molded part 209 is under the overmolded backing layer 210. In one example, the overmolded material of the backing layer 210 may be a plastic material such as acrylonitrile styrene acrylate (ASA) or acrylonitrile butadiene styrene (ABS). Other plastic materials that may be used include polyethylene terephthalate (PETE or PET), polyethylene (PE), polyvinyl chloride (PVC), polypropylene (PP), polystyrene (PS), among other polymers.

Now referring to FIG. 21, areas 207 of the rear side 302 of the injection molded part 209 that are not metallized by the metallic coating 205 may provide an adhesive bond to the overmolded material of the backing layer 210. In one example, the adhesive effect is provided as a result of the materials used for the injection molded part 209 having adhesive properties. In another example, an adhesive (not shown) is applied to the rear side 302 of the injection molded part 209 to provide the adhesive effect. For example, the adhesive may include an epoxy adhesive. The un-metallized areas 207 of the injection molded part 209 surround the metallized areas of the three dimensional form 208 on the rear side 302 of the injection molded part 209. As a result, the metallized areas of the three dimensional form 208 on the rear side 302 of the injection molded part 209 may be fully encapsulated and sealed. The encapsulating of the metallized areas of the three dimensional form 208 on rear side 302 of the injection molded part 209 protects the metallized coating and provides improved durability and environmental performance.

In one example, an adhesive bond with a tensile pull apart force of greater than or equal to about 4.7 N/mm$^2$ to failure may be achieved by the adhesion of the injection molded part 209 to the backing layer 210. It has been demonstrated on plaques that an adhesive bond with such a tensile pull apart force passes the following tests:

Dry heat at 115 degrees Celsius for 1 hour;

High temperature aging for 1,000 hours at 80 degrees Celsius;

Humidity aging at 40 degrees Celsius, 95 relative humidity (RH) for 1,000 hours;

Thermal shock for 200 cycles at temperatures between −40 degrees Celsius to +85 degrees Celsius for 1 hour per cycle;

Thermal cycle for 10 cycles: 75 degrees Celsius ±2 degrees Celsius for 4 hours→38 degrees Celsius ±2° Celsius, 95% ±5% relative humidity (RH) for 16 hours→−30 degrees Celsius ±2 degrees Celsius for 4 hours;

Cold temperature aging at 40 degrees Celsius for 240 hours; and

Salt spraying for 1,000 hours.

Referring back to FIG. 19, in step 140, the front side 301 of the clear injection molded part 209 may be spray coated with a hard coat 203 to improve abrasion resistance of the clear injection molded part 209, and ultimately the abrasion resistance of the assembled vehicle grille 200. In step 140 of FIG. 9, only the hard coat 203 is shown because, in this step, the front side 301 of the clear injection molded part 209 is under the hard coat 203.

Now referring to FIG. 21, the hard coat 203 is illustrated in more detail as a layer on top of the front side 301 of the injection molded part 209. The hard coat 203 may be a scratch and abrasion resistant coating, a corrosion resistant coating, a water resistant coating, among other coating types. The hard coat 203 may include any material such as a ceramic or plastic coating which may be provided as a transparent coating with one or more of the functional benefits described.

Referring back to FIG. 19, in steps 150 and 160, a first injection molded mesh 501 and a second injection molded mesh 502 are formed. The meshes 501, 502 are separately formed portions both of which are assembled in the vehicle grille 200 to form the fully assembled product in step 170.

Figure 20:
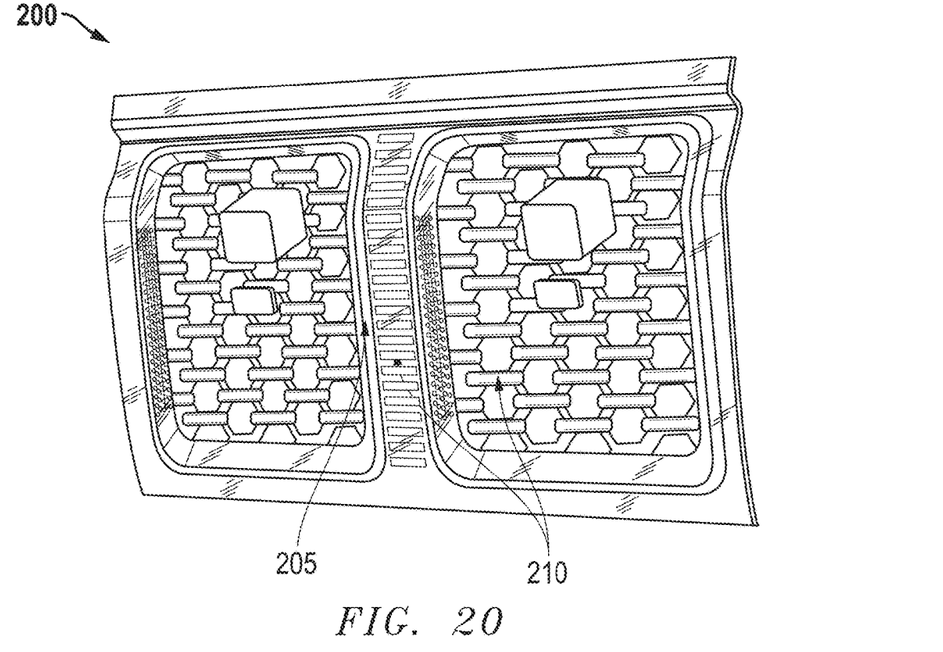
FIG. 20 is a front perspective view of an example of a vehicle grille manufactured by the process illustrated in FIG. 19.

FIG. 20 is a front perspective view of an example of the assembled vehicle grille 200 manufactured by the process illustrated in FIG. 19.

Referring to FIG. 20, the metallized coating 205 and the adjacent backing layer 210 can be seen from a front side of the vehicle grille 200. While the metallized coating 205 and the backing layer 210 are not on the front surface of the vehicle grille 200, the front surface of the grille 200 is see-through so that the metallized coating 205 and the backing layer 210 can be seen.

The vehicle grille 200 may have a finish that is visibly different from a front surface electroplated part which is typically used in conventional vehicles. The described vehicle grille 200 provides three dimensional depth as the light reflected off the metal passes through the varying thicknesses of clear substrate before it is reflected.

FIG. 21 is a diagram illustrating an example of the layers of the vehicle grille 200 of FIG. 20.

Referring to FIG. 21, the injection molded part 209 includes the three dimensional form 208 on its rear side 302. The three dimensional form 208 may include at least one of a gloss surface 410 and a grained surface 405. As described above in reference with FIG. 19, selected areas of the three dimensional form 208 may be metallized with a metallized coating 205 on a rear side 302 of the injection molded part 209. Areas 207 with no metallized coating 205 may provide adhesive surfaces for adhering to a backing layer 210. The overmolded material of the backing layer 210 may be a dark plastic material. The injection molded part 209 may be coated by a hard coat 203 for abrasion and improved environmental resistance. As discussed above, the hard coat 203 may be a ceramic or plastic coating which may be provided as a transparent coating with functions including scratch and abrasion resistance, corrosion resistance, water resistance, among other function.

As a result of this arrangement, a person viewing the vehicle grille 200 from the front at a position of viewer's eye E may see the bright metal appearance of the metallized coating 205 through the clear injection molded part 209 at the regions with the metallized coating 205, i.e. the region between the dashed lines. A person viewing the vehicle grille 200 from a front side may also see the black or glossy appearance of the backing layer 210 through the clear injection molded part 209 at the regions without the metallized coating 205, i.e. the regions to the left and right of the dashed lines.

The metallized coating 205 may be provided as a liquid coating which takes the shape of the underlying three dimensional form 208 or may be provided as a tape type coating. All layers are shown in FIG. 21 as rectangular or box shapes are shown as such for illustrative purposes only to illustrate the layers of the vehicle grill 200. The actual shape of each layer may not correspond to the illustrated shapes.

In some examples, providing a grained surface 405 on the rear side 302 of the injection molded part 209 provides additional detailed grain effects. The grained surface 405 may be protected in this arrangement. Detailed grain effects in a conventional electroplated parts cannot be seen because the coating in these conventional parts is thicker and washes out the detailed grain.

In an example, it can be advantageous to include a raised step (not shown) at the perimeter of the metallized area to simplify masking of the rear side 302 of the injection molded part 209 where the overmold is intended to be visible. An automotive short range radar can be integrated into the vehicle grille 200 and used with a radar compatible coating such as aluminum germanium (AlGe) instead of using a metal such as Chrome or Aluminum.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that changes could be made to the embodiments described above without departing from the broad inventive concept thereof. It is understood, therefore, that the present disclosure disclosed herein is not limited to the particular embodiments disclosed, and it is intended to cover modifications within the spirit and scope of the present disclosure.

What is claimed is:

1. A vehicle grill, comprising:
a clear injection molded main body comprising an injection molded grill mesh having a front side and a rear side with a three dimensional form on the rear side, the clear injection molded main body being comprised of a light transmissive material;
a metallized coating on one or more portions of the three dimensional form on the rear side of the injection molded main body, wherein light passing through the clear injection molded main body is reflected off of the metallized coating; and
a backing layer overmolded on the rear side of the injection molded main body, the three dimensional form, and the metallized coating, wherein the backing layer is comprised of a non-reflective material.

2. The vehicle part of claim 1, wherein the three dimensional form comprises at least one of inwardly protruding areas formed into the rear side of the injection molded main body, outwardly protruding areas protruding from the rear side of the injection molded main body, or one or more surfaces comprising a grain effect.

3. The vehicle part of claim 1, wherein the injection molded main body comprises polycarbonate.

4. The vehicle part of claim 1, further comprising a hard coating applied to the front side of the injection molded main body for improved abrasion resistance.

5. The vehicle part of claim 1, wherein the metallized coating is applied around apertures of the vehicle grille.

6. The vehicle part of claim 1, wherein the metallized coating comprises at least one of aluminum, chrome, aluminum germanium (Al Ge), and aluminum titanium.

7. The vehicle part of claim 1, wherein the backing layer comprises a plastic material.

8. The vehicle part of claim 1, wherein one or more areas of the injection molded main body that are not coated with the metallized coating form an adhesive bond with the overmolded backing layer.

9. The vehicle part of claim 8, wherein the adhesive bond comprises a tensile pull apart force of greater than or equal to about 4.7 N/mm$^2$.

10. The vehicle part of claim 1, wherein the one or more portions of the three dimensional form that are coated with the metallized coating are fully encapsulated and sealed between the injection molded main body and the overmolded backing layer.

11. A method of making a vehicle grill, comprising:
injection molding a clear main body comprising a grill mesh having a front side and a rear side, the clear main body being comprised of a light transmissive material;
forming a three dimensional form on the rear side of the injection molded main body;
coating a metallized coating on one or more portions of the three dimensional form on the rear side of the injection molded main body, wherein light passing through the clear main body is reflected off of the metallized coating; and
overmolding a backing layer on the rear side of the injection molded main body, the three dimensional form, and the metallized coating, wherein the backing layer is comprised of a non-reflective material.

12. The method of claim 11, wherein the three dimensional form comprises at least one of inwardly protruding areas formed into the rear side of the injection molded main body, outwardly protruding areas protruding from the rear side of the injection molded main body, or one or more surfaces comprising a grain effect.

13. The method of claim 11, wherein the injection molded main body comprises polycarbonate.

14. The method of claim 11, further comprising applying a hard coating to the front side of the injection molded main body for improved abrasion resistance.

15. The method of claim 11, wherein the coating of the metallized coating comprises coating the metallized coating around apertures of the vehicle grille.

16. The method of claim 11, wherein the metallized coating comprises at least one of aluminum, chrome, aluminum germanium (AlGe) and aluminum titanium.

17. The method of claim 11, wherein the backing layer comprises a plastic material comprising at least one of acrylonitrile styrene acrylate (ASA), acrylonitrile butadiene styrene (ABS), polyethylene terephthalate (PETE or PET), polyethylene (PE), polyvinyl chloride (PVC), polypropylene (PP), and polystyrene (PS).

18. The method of claim 11, wherein one or more areas of the injection molded main body that are not coated with the metallized coating form an adhesive bond with the overmolded backing layer.

19. The method of claim 18, wherein the adhesive bond comprises a tensile pull apart force of greater than or equal to about 4.7 N/mm$^2$.

20. The method of claim 11, wherein the one or more portions of the three dimensional form that are coated with the metallized coating are fully encapsulated and sealed between the injection molded main body and the overmolded backing layer.

* * * * *